United States Patent
Chidlovskii (10) Patent No.: US 9,989,372 B2
(45) Date of Patent: Jun. 5, 2018

(54) TRIP RERANKING FOR A JOURNEY PLANNER

(71) Applicant: Conduent Business Services, LLC, Dallas, TX (US)

(72) Inventor: Boris Chidlovskii, Meylan (FR)

(73) Assignee: Conduent Business Services, LLC, Dallas, TX (US)

(*) Notice: Subject to any disclaimer, the term of this patent is extended or adjusted under 35 U.S.C. 154(b) by 12 days.

(21) Appl. No.: 14/533,310

(22) Filed: Nov. 5, 2014

(65) Prior Publication Data

US 2016/0123748 A1    May 5, 2016

(51) Int. Cl.
G01C 21/34    (2006.01)
G06Q 10/02    (2012.01)

(52) U.S. Cl.
CPC ......... *G01C 21/3453* (2013.01); *G06Q 10/02* (2013.01); *G01C 21/3484* (2013.01)

(58) Field of Classification Search
CPC . G01C 21/3453; G01C 21/3484; G06Q 10/02
USPC ........................................................ 701/410
See application file for complete search history.

(56) References Cited

U.S. PATENT DOCUMENTS

| 8,510,315 B2 | 8/2013 | Zheng et al. |
| 8,731,835 B2 | 5/2014 | Chidlovskii et al. |
| 2010/0280853 A1* | 11/2010 | Petralia ............... G06Q 10/047 705/5 |
| 2012/0011112 A1* | 1/2012 | Bian ................. G06F 17/30864 707/723 |
| 2013/0060468 A1* | 3/2013 | Delling ............... G06Q 10/047 701/527 |
| 2013/0246219 A1 | 9/2013 | Mishanski et al. |
| 2013/0317747 A1* | 11/2013 | Chidlovskii ............. G06N 5/02 701/540 |
| 2015/0345951 A1* | 12/2015 | Dutta ................. G01C 21/3605 701/400 |

(Continued)

FOREIGN PATENT DOCUMENTS

| EP | 2 618 294 | 7/2013 |
| EP | 2 667 334 | 11/2013 |

OTHER PUBLICATIONS

Yunbo Cao et al., "Adapting Ranking SVM to Document Retrieval," *Proceedings of the 29th Annual International ACM SIGIR Conference on Research and Development in Information Retrieval*, SIGIR '06, pp. 186-193, New York, NY, USA, 2006.

(Continued)

*Primary Examiner* — Khoi Tran
*Assistant Examiner* — Robert Nguyen
(74) *Attorney, Agent, or Firm* — Fay Sharpe LLP (57) ABSTRACT

A method and system are disclosed for re-ranking trips from a journey planner using real traveler preferences. A trip request is received that includes an origin, a destination and a departure time. An associated journey planner retrieves a list of candidate trips that correspond to the request. A ranking function, ascertained from actual trips that match the trip request and from which are determined real-world traveler preferences, is applied to the list of candidate trips output by the journey planner, thereby re-ranking the list of candidate trips to reflect real-world traveler's experiences.

16 Claims, 8 Drawing Sheets

(56) References Cited

U.S. PATENT DOCUMENTS

2015/0345972 A1* 12/2015 Saito ................. G01C 21/3461
　　　　　　　　　　　　　　　　　　　　　　　　　701/521

OTHER PUBLICATIONS

Ralf Herbrich et al., "Large Margin Rank Boundaries for Ordinal Regression," *Advances in Large Margin Classifiers*, pp. 115-132, 2000.

Julia Letchner et al., "Trip Router with Individualized Preferences (TRIP): Incorporating Personalization into Route Planning," *Proceedings of the 18$^{th}$ Conference on Innovative Applications of Artificial Intelligence*, vol. 2, IAAI '06, pp. 1795-1800, AAAI Press, 2006.

Linjun Yang et al., "Supervised Reranking for Web Image Search," *Proceedings of the International Conference on Multimedia*, MM 2010, pp. 183-192, New York, NY, USA, 2010. ACM.

* cited by examiner

TRIP RERANKING FOR A JOURNEY PLANNER

BACKGROUND

The subject disclosure is directed to the transportation arts, trip planning arts, the data processing arts, the data analysis arts, the tracking arts, the predictive arts, and the like.

Many cities and agglomerations have produced a variety of journey planners in the form of a web or mobile application. Upon a user travel request, these planners are configured to generate journeys, i.e., trips on a transportation system via public or private transportation means, using a static library of roads and public transportation network and services attributes and data.

A public transport trip planner, or journey planner, may be designed to provide information about available public transport journeys or routes along the public transportation system, for example via a Web-based application. Such an application may prompt a prospective traveler to input an origin and a destination, and then use a trip planning engine to determine a route between the two input locations using specified available public transportation services and routes, e.g., buses, trams, trains, etc., depending on available schedules for these services. Accordingly, transportation authorities may include such a public transport journey planner on their websites.

A trip planner may find one or more suggested paths between an origin and a destination. The origin and destination may be specified as geospatial coordinates or names of points of access to public transport such as bus stops, stations, airports or ferry ports. A location finding process may resolve the origin and destination into the nearest known nodes on the transport network in order to compute a trip plan over its data set of known paths, i.e., routes. Trip planners for large networks may use a search algorithm to search a graph of nodes (representing access points to the transport network) and edges (representing possible journeys between points). Different weightings such as distance, cost or accessibility may be associated with each edge. When suggesting the journey or trip plans, the trip planner uses the abstract model of the public transportation network and those plans may not reflect the trips that travelers make every day on these routes.

That is, the aforementioned journey planners typically ignore both the time at which a route is to be traveled and, more generally, the preferences of the passengers being served. Instead, preference is given to the shortest route or the fastest route, but not the actual routes real-world travelers took between an origin and a destination. Although these planners are increasingly reliable in their knowledge of the underlying transportation network and available services, each planner shares the same static-world assumptions. In particular, each planner makes a general assumption of constancy and universality, i.e., that the optimal trip is independent of the time and day of the actual journey and of the detailed preferences of passengers.

It will be appreciated, however, that constancy and universality are poor assumptions. Most urban travelers can verify that the best trip between work and home at midnight is not necessarily the best choice to make between the same locations at a different time, e.g., 8:00 AM. Similarly, different passengers may choose different ways to travel between the same origin and destination points.

While differences in knowledge may play a role in these divergent choices, in many cases passengers simply have different preferences about the trips they like to take. For example, one passenger may avoid multiple changes (transfers from bus to bus, train/tram to train/tram, etc.), by extending the duration of her journey by a few minutes, while another passenger simply wants to arrive as quickly as possible to the destination.

When a user queries a planner with a query to journey from an origin o to destination d starting at time s, there are often a large number of trips satisfying the query. The planner provides the k-top recommendations according to a set of predefined criteria, such as the minimal transfer time, the minimal number of changes, etc. The operations of the journey planner are similar to the manner in which information retrieval systems operate, i.e., where the goal is to place the most relevant documents among the k-top answers. It will be appreciated, therefore, that it is critical in intelligent journey planning to suggest k-top trips which reflect the real passenger preferences.

In practice, there is a divergence between the planner provided recommendations and the actual routes and/or trips taken by travelers of the transportation network. As indicated above, trips proposed by the trip planner do not necessarily correspond to choices made by real-world travelers who use the transportation network on a regular basis.

Thus, it would be advantageous to provide an effective system and method for collecting traveler information regarding real world use of a transportation network to facilitate recommendations by a trip planner to users thereof.

INCORPORATION BY REFERENCE

The following references, the disclosures of which are incorporated herein by reference, in their entirety, are mentioned.

U.S. Pat. No. 8,510,315 to Zheng et al., issued on Aug. 13, 2013, and entitled PRIORITIZING TRAVEL ITINERARIES.

U.S. Patent Application Publication No. 2013/0246219, to Mishanski et al., filed on Mar. 14, 2012 and entitled RANKING AND OPTIMIZING TRIPS.

U.S. Pat. No. 8,731,835 to Chidlovskii et al., issued on May 20, 2014, and entitled SYSTEM AND METHOD FOR TRIP PLAN CROWDSOURCING USING AUTOMATIC FARE COLLECTION DATA.

Yunbo Cao, Jun Xu, Tie-Yan Liu, Hang Li, Yalou Huang, and Hsiao-Wuen Hon. Adapting Ranking SVM to Document Retrieval. In *Proceedings of the 29th Annual International ACM SIGIR Conference on Research and Development in Information Retrieval*, SIGIR '06, pages 186-193, New York, N.Y., USA, 2006. ACM.

R. Herbrich, T. Graepel, and K. Obermayer. Large Margin Rank Boundaries for Ordinal Regression. In *Advances in Large Margin Classifiers*, pages 115-132, 2000.

Julia Letchner, John Krumm, and Eric Horvitz. Trip Router with Individualized Preferences (Trip): Incorporating Personalization into Route Planning. In *Proceedings of the 18th Conference on Innovative Applications of Artificial Intelligence—Volume 2*, IAAI'06, pages 1795-1800. AAAI Press, 2006.

Linjun Yang and Alan Hanjalic. Supervised Reranking for Web Image Search. In *Proceedings of the International Conference on Multimedia*, MM 2010, pages 183-192, New York, N.Y., USA, 2010. ACM.

BRIEF DESCRIPTION

In one aspect of the exemplary embodiment, a method for re-ranking trips on an associated transportation network is provided. The method includes receiving a trip request from an associated user, the trip request including an origin, a destination and a departure time on the associated transportation network, and determining a ranking function associated with the trip request. The method further includes receiving, from an associated journey planner, a list of candidate trips on the associated transportation network corresponding to the received trip request, and applying the ranking function to the list of candidate trips so as to re-rank the candidate trips in the list thereof. In addition, the method includes returning, in response to the trip request, a re-ranked list of candidate trips, wherein at least one of the receiving, retrieving, determining, applying or returning is performed by a computer processor.

In another aspect, a system for re-ranking trips on an associated transportation network is provided. The system includes a journey planner including a journey planning engine that is configured to receive a trip request and return a list of candidate trips on the associated transportation network. The system also comprises a re-ranking component configured to apply a ranking function to the list of trips and generate a re-ranked list of candidate trips. In addition, the system includes memory which stores instructions for retrieving, from an associated database, a set of actual trips corresponding to the received trip request, the set of actual trips each having a common origin, destination and departure time corresponding to the received trip request. For each trip in the set of actual trips, the system includes instructions for receiving, from the journey planner, a set of trip candidates corresponding to the trip request, and analyzing the set of top trip candidates to determine whether the trip of the set of actual trips has been preferred to any of candidate trips. For each trip in the set of actual trips, the system also includes instructions for adding the trip of the set of actual trips to a set of training trips associated with the trip request responsive to a preference of the trip over the candidate trips, and learning a ranking function corresponding to the trip request in accordance with the set of training trips. The system further includes instructions for returning the re-ranked list of candidate trips in accordance with the learned ranking function. Furthermore, the system includes a processor in communication with the memory which executes the instructions.

In another aspect, a computer-implemented method for re-ranking trips on an associated public transportation network is provided. The method includes receiving a trip request from an associated user, the trip request including an origin, a destination and a departure time on the associated transportation network. The method also includes retrieving, from an associated database, a set of actual trips corresponding to the received trip request, the set of actual trips each having a common origin, destination and departure time corresponding to the received trip request. For each trip in the set of actual trips matching the received trip request, the method includes receiving, from the journey planner, a set of trip candidates corresponding to the trip request, analyzing the set of top trip candidates to determine whether the trip of the set of actual trips has been preferred to any of candidate trips, and adding the trip of the set of actual trips to a set of training trips associated with the trip request responsive to a preference of the trip over the candidate trips. Additionally, for each trip, the method includes developing, for each trip in the set thereof, a set of time-variant features characterizing the trip on the associated transportation network, converting the set of actual trips into a set of real-world traveler preferences in accordance with the set of time-variant features, the set of real-world traveler preferences corresponding to implicit preferences of travelers of the associated transportation network, and learning a ranking function corresponding to the trip request in accordance with the set of training trips and real-world traveler preferences. The computer-implemented method further includes receiving, from an associated journey planner, a list of candidate trips on the associated transportation network corresponding to the received trip request, applying the ranking function to the list of candidate trips so as to re-rank the candidate trips in the list thereof, and returning, in response to the trip request, a re-ranked list of candidate trips.

BRIEF DESCRIPTION OF THE DRAWINGS

FIGS. 3B-1 and 3B-2 are graphical representations of travel time and average trip counts for five-top trips, respectively, for the example of FIG. 3A.

DETAILED DESCRIPTION

One or more embodiments will now be described with reference to the attached drawings, wherein like reference numerals are used to refer to like elements throughout. Aspects of exemplary embodiments related to systems and methods for re-ranking trips on an associated transportation network are described herein. In addition, example embodiments are presented hereinafter referring to travel planning on transportation networks, however application of the systems and methods set forth can be made to other areas utilizing "crowd-wisdom" recommendations.

As described herein, there is described a method for providing an updated listing of trip plans on a public transportation network that utilizes "crowd-wisdom" gathered from actual travelers on the network to rank the listed trip plans. In one embodiment, pairs of origins-destinations corresponding to actual trips taken by travelers is gathered. These pairs may be obtained from reporting by the travelers, from automated ticket validation systems, or the like. The validation information may include the time travel was undertaken, the origin (boarding) and destination (alighting) stop or stops along the way, the route taken (transfers, etc.), and other information pertaining to a trip on the transportation network. For any given origin-destination pair, the presence of a validation is an implicit recommendation of the route taken, i.e., a person actually took that route at that time between that origin and that destination. When gathered for a large transportation network, such as a public transportation network of a city, there may be a substantial number of such recommendations for particular routes at particular times.

When a user accesses a trip planner, according to one embodiment, the trip planner may output a list of k-top results, i.e., a list of recommended routes between an origin and a destination selected by the user. A ranking function may be calculated using the received implicit preferences gained from real-world travelers, i.e., experienced users of the transportation system. Thereafter, the ranking function may be applied to the list of results so as to re-rank the results, with the higher ranked trip corresponding to one "implicitly recommended" by the knowledgeable travelers.

It will be appreciated that trip planner recommendations may diverge from real choices made by travelers. That is, trips proposed by the planner should correspond to choices made by real travelers who use the network on the regular basis. However, if the planner proposals diverge from the real choices, then the planner misses some important knowledge when answering user queries for trips. Accordingly, one embodiment disclosed herein utilizes a collection of real trips as a ground truth to validate the planner recommendations, and in the case of divergence, formulates a suitable re-ranking methodology to re-rank the recommendations so as to better reflect the reality.

The embodiments disclosed herein may utilize passenger preferences and time-variant traffic condition estimates in journey planning. Using a large collection of passenger trips, time-variant parameters for choosing a given trip in a transportation network may be learned. An example implementation using real travelers data for a selected transportation network of a city, demonstrates that the trips are measurably closer to those actually chosen by passengers than are the trips produced by planners that use static heuristics. This provides several advantages over current trip planners, particularly in transferring the knowledge of frequent travelers of the transportation network to novice travelers utilizing the trip planner. The accuracy of the trip planner is also increased as the "crowd-wisdom" of experienced travelers is factored into the recommendation of a route from the selected origin to the selected destination as the selected time of day, day of week, etc.

Figure 1A:
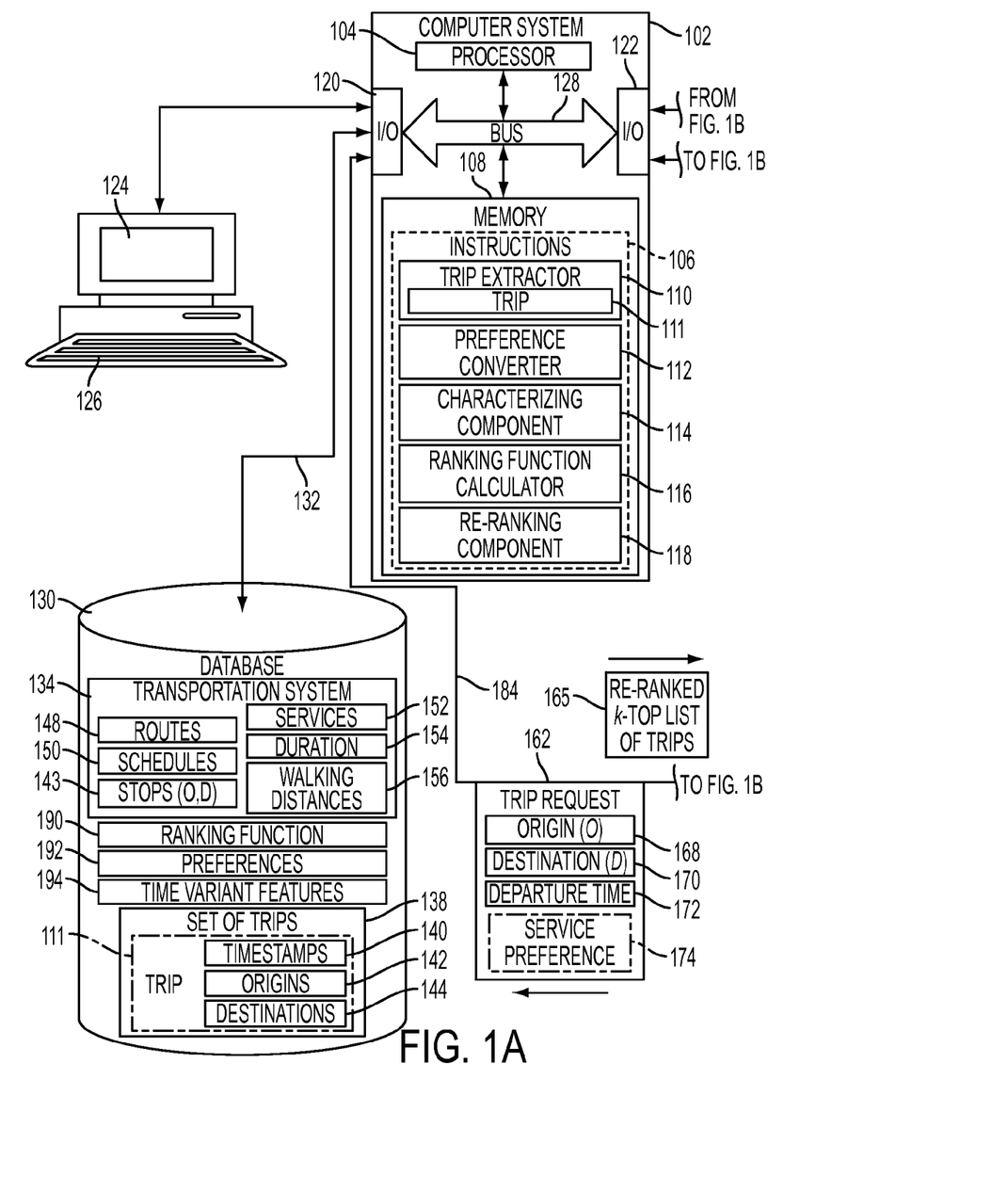
FIGS. 1A-B illustrate a functional block diagram of a re-ranking system for trips on an associated transportation network in accordance with one aspect of the exemplary embodiment.
Figure 1B:
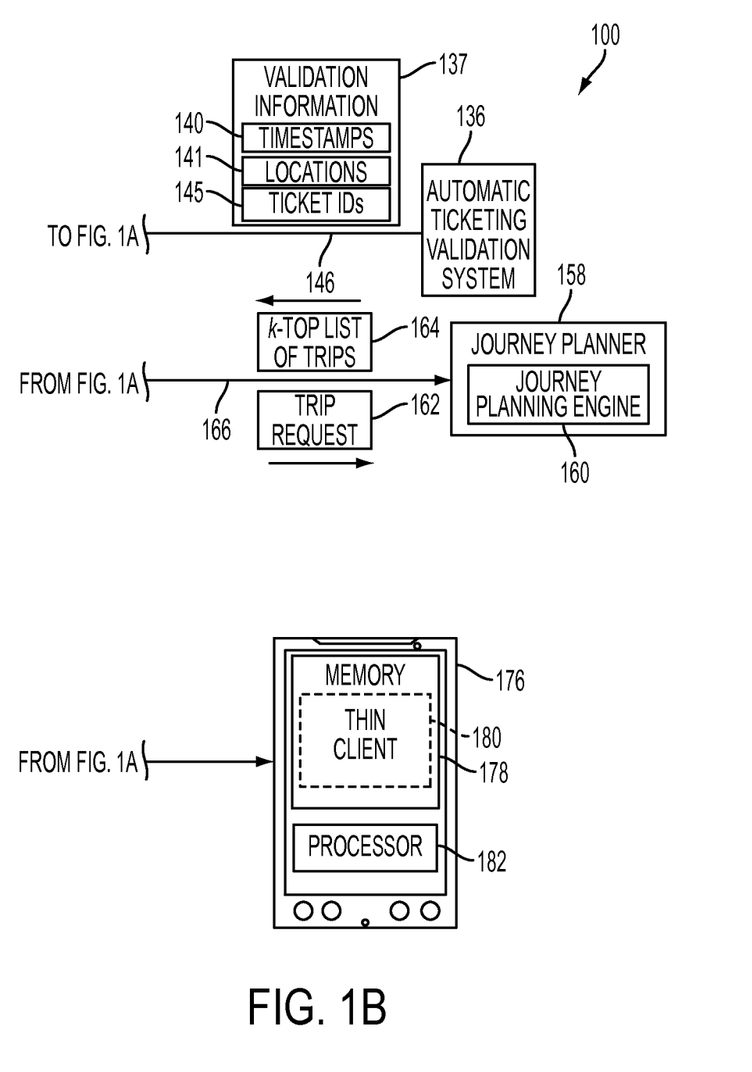

Referring now to FIGS. 1A-1B, there is shown a system 100 for re-ranking a list of trips using crowd-wisdom. The system 100 utilizes the implicit preferences of travelers for one route over other routes determined from actual trips taken by travelers of an associated transportation system 134. It will be appreciated that the various components depicted in FIGS. 1A-1B are for purposes of illustrating aspects of the exemplary hardware, software, or a combination thereof, are capable of being substituted therein.

It will be appreciated that the re-ranking system 100 of FIGS. 1A-1B is capable of implementation using a distributed computing environment, such as a computer network, which is representative of any distributed communications system capable of enabling the exchange of data between two or more electronic devices. It will be further appreciated that such a computer network includes, for example and without limitation, a virtual local area network, a wide area network, a personal area network, a local area network, the Internet, an intranet, or the any suitable combination thereof. Accordingly, such a computer network comprises physical layers and transport layers, as illustrated by various conventional data transport mechanisms, such as, for example and without limitation, Token-Ring, Ethernet, or other wireless or wire-based data communication mechanisms. Furthermore, while depicted in FIGS. 1A-1B as a networked set of components, the system and method are capable of implementation on a stand-alone device adapted to perform the methods described herein.

As shown in FIGS. 1A-1B, the trip re-ranking system 100 includes a computer system 102, which is capable of implementing the exemplary method described below. The computer system 102 may include a computer server, workstation, personal computer, laptop computer, cellular telephone, tablet computer, pager, combination thereof, or other computing device capable of executing instructions for performing the exemplary method.

According to one example embodiment, the computer system 102 includes hardware, software, and/or any suitable combination thereof, configured to interact with an associated user, a networked device, networked storage, remote devices, or the like. The exemplary computer system 102 includes a processor 104, which performs the exemplary method by execution of processing instructions 106 which are stored in memory 108 connected to the processor 104, as well as controlling the overall operation of the computer system 102.

The instructions 106 include a trip extractor 110 that receives validation information 137 from one or more automatic ticketing validation systems 136 associated with the transportation network 134. The validation information 137 is utilized by the trip extractor 110 to extract a trip 111 that a traveler actually took on the transportation network 134, which trip 111 may then be added to the set of trips 138, as discussed below. The validation information 137 may include, for example, timestamps 140, locations 141, ticket identification 145, and the like. The trip extractor 110 may process the received validation information 137 to determine an origin 142 and a destination 144 for the particular ticket identification 145 associated with a particular traveler. That is, the trip extractor 110 may derive, from the timestamps 140 and locations 141 contained in the validation information 137, i.e., the origin 142 of the traveler, and deduce, calculate, or otherwise determine the corresponding destination 144 of that traveler. The trip extractor 110 may then output a trip 111 that corresponds to the actual journey the corresponding traveler (i.e., ticket identification 145) took on the transportation system 134. Various embodiments of the subject application may utilize the collection of additional information from the automatic ticketing validation system 136, e.g., validation sequences (set of boarding and alighting validations with corresponding timestamps over a particular period of time), or the like, from which additional information trips 111 may be extracted by the trip extractor 110.

The instructions 106 include a preference converter 112 that implicitly derives preferences 192 from a data set of trips 138 accessible by the computer system 102. That is, the preference converter 112 determines a set of preferences 192 from information about trips 111 extracted by the trip extractor 110 from the validation information 137 from automatic ticketing validation systems 136, e.g., the times 140, origins 142, and destinations 144 of actual travelers on the associated transportation network 134, as discussed below. According to one embodiment, the preferences 192 are inferred from the set of trips 138, e.g., a preferred trip is one that a large number of travelers selected at a specific time. The preferences 192 may include, for example, traffic preferences (e.g., traveler avoids buses), temporal and/or spatial (time, route, etc.) inferred from data set 138. That is, it will be appreciated that the preferences 192 correspond to the reason (implicit/explicit) that a traveler preferred a particular route (trip 111) at a particular time.

The instructions 106 may also include a characterizing component 114 that generates a set time variant features 194 characterizing any given trip 111 in the associated transportation network 134. The characterizing component 114 may process each trip 111 in the set of trips 138 actually taken or possible on the transportation network 134 (e.g., any origin/destination pair and the various intervening stops therebetween) to generate a set of time variant features 194 characterizing the journey between such pair or on the actual trip.

In addition, the instructions 106 may also include a ranking function calculator 116 that calculates a ranking function 190 for re-ranking trips 111 output by a journey planner 158 in response to a query, i.e., a trip request 162 from an associated user. The ranking function 190 may be determined based upon validation information 137 and the corresponding trips 111 of actual travelers of the transportation network 134. For each query, or trip request 162, a ranking function 190 may be calculated to rank all trips 111 that have the origin 168, destination 170 and departure time 172 corresponding to the trip request 162. The ranking function 190 calculated by the ranking function calculator 116 may further be determined using preferences 192 and time variant features 194 associated with the travelers and/or transportation network 134, as discussed in greater detail below. In accordance with one embodiment, support vector machine (SVM) is used to facilitate determine a suitable ranking function 190. For example, it may be assumed that there exists an input space $X \in R^m$, where m denotes number of features. There exists an output space of ranks (categories) represented by labels $Y=y_1, y_2, \ldots, y_q$ where q denotes the number of ranks. Furthermore, it may be assumed that there exists a total order between the ranks $y_1 > y_2 >, \ldots, > y_q$, where $>$ denotes a preference relationship. Accordingly, the example embodiment considers a set of ranking functions $f \in F$ that can determine the preference relations between instances:

$$x_i > x_j \equiv f(x_i) > f(x_j). \quad (1)$$

For a given set of ranked instances $S=\{(x_i, y_i)\}$, $i=1, \ldots, n$ from the space $X \times Y$, the best function $f^* \in F$ that minimizes a certain loss function with respect to the given ranked instances is to be selected. The above-identified problem may be formalized as learning for classification on pairs of instances, as expanded upon in R. Herbrich, T. Graepel, and K. Obermayer. "Large margin rank boundaries for ordinal regression." In Advances in Large Margin Classifiers, pages 115-132, 2000.

First, it is assumed that $f$ is a linear function, $f_w(x) = w^T x$ where w denotes a vector of weights. The relation $x_i > x_j$ between instance pairs $x_i$ and $x_j$ can be expressed by a new vector $x_i - x_j$. Any instance pair and their preference relation create a new vector and a new label. Let $x_1$ and $x_2$ denote the first and second instances, and let $y_1$ and $y_2$ denote their ranks, then a new instance $(x_1 - x_2, z_i)$ where $z_i = 1$ if $y_i > y_2$, 0 otherwise, is obtained.

From the training dataset S, a new training data set S' containing labeled vectors, $S' = \{x_{i1} - x^{i2}, z_i\}_{i=1}^l$, is created. Set S' is used as a training set to construct an SVM model that can assign either positive label $z=+1$ or negative label $z=-1$ to any vector $x^1 - x^2$. Constructing this SVM model is equivalent to solving the following quadratic optimization problem:

$$\min_w M(w) = \frac{1}{2}\|w\|^2 + C \sum_{i=1}^l \xi_i \quad (2)$$

$$\text{subject to } \xi_i \geq 0, \ z_i w \cdot (x_i^1 - x_i^2)^T \geq 1 - \xi_i, \ i=1, \ldots, l$$

Note that the optimization (2) is equivalent to $$\min \Sigma_{i=1}^l L_H(1 - z_i w^T \cdot (x_i^1 - x_i^2)) + \lambda\|w\|^2, \quad (3)$$

where the first term is the empirical hinge loss and the second term is regularizer, and $$\lambda = \frac{1}{2C}.$$

It will be appreciated that the optimization problems above can be solved using convex or gradient-based methods.

If w* is the weights obtained by solving equation (2), then w* can be used to form a ranking function $f_w*$ for ranking instances:

$$f_{w'}(x) = w^{*T} x.$$

According to one embodiment of the subject systems and methods described herein, when ranking SVM is applied to trip re-ranking, an instance in the form of a feature vector x(t) is created from one trip t. Each feature is defined as a function of the trip t and the user query it would answer. The instances from all queries are then combined in training. Features describing query-trip pairs are described in the following sections.

Returning to FIGS. 1A-1B, the instructions 106 may further include a re-ranking component 118 configured to apply the ranking function 190 to a k-top list 164 output by a journey planner 158 in response to a corresponding trip request 162. The re-ranking component 118 may utilize the ranking function 190 to generate a re-ranked k-top list 165 of the trips 111 in the k-top list 164 output by the journey planner 158, thereby ranking the trips 111 in the list 164 based upon the preferences 192 of real travelers as applied to the origin 168, destination 170, departure time 172, and service preference 174 of the trip request 162. The re-ranked k-top list 165 may then be communicated to the associated user, as discussed below.

The system 100 may further include the journey planner 158 equipped with a journey planning engine 160. According to one embodiment contemplated herein, the journey planning engine 160 determines a set of candidate trips for a user to take, i.e., one or more paths between a selected origin 168 and a selected destination 170. As will be appreciated, the journey planner 158 may facilitate the determination of one or more paths between stops 143 associated with the selected origin 168 and destination 170, using the routes 148, schedules 150, durations 154, walking distances 156, stops 143, and services 152 (e.g., bus, train, subway, etc.) associated with a transportation system 134. The journey planner 158 may determine one or more paths between the selected origin 168 and destination 179 as provided by the user and output a top list (k-list) of trips 164. It will be appreciated that when determining a trip between the selected origin 168 and the destination 170, the journey planner 158 may use an abstract model of the transportation network 134, i.e., a model based on the routes 148 and schedules 150, as well as other information available to the journey planner 158 regarding the transportation network 134, user preferences, and the like. The journey planner 158 may have access to the data stored on the database 130 in communication with the computer system 102, may have data related to the transportation system 134, e.g., routes 148, schedules 150, stops 143, services 152, etc., stored on a separate database (not shown) in communication therewith. The journey planner 158 may further be in communication with an associated database (not shown) that stores previously generated lists of journeys or trips responsive to particular origin/destination pairs, and the illustration in FIGS. 1A-1B is intended as one example implementation of the aforementioned journey planner 158.

As will be appreciated, a suitable journey planner 158 for a public transportation network 134 is configured to provide information about available public transport journeys, or trips. Input for the journey planner 158 includes an origin o 168, a destination d 170 and starting time s (departure time 172), and uses the journey planning engine 160 to find a route from o to d using specified services (174) using available services of the transportation network 134. It will be understood that the choice of routes for the journey planner 158 on a public transportation network 134 is more constrained than for a road route planner, moreover it is not only about choosing a route but also about choosing a service on that route.

The journey planner 158 finds one or more suggested journeys between an origin and a destination. In accordance with one embodiment, the planner 158 uses a search algorithm to search a graph of nodes (representing access points to the transport network 134) and edges (representing possible journeys between points). Different weightings such as distance, cost or accessibility may be associated with each edge.

Searches may be optimised on different criteria, for example fastest, shortest, least changes, cheapest. They may be constrained for example to leave or arrive at a certain time, to avoid certain waypoints, etc. Such a planner 158 usually disposes multiple sources of public and private information, including the detailed network description, available routes, stop locations, the service schedule, walking distances etc. in order to better answer the user queries, i.e., trip requests 162.

The memory 108 may represent any type of non-transitory computer readable medium such as random access memory (RAM), read only memory (ROM), magnetic disk or tape, optical disk, flash memory, or holographic memory. In one embodiment, the memory 108 comprises a combination of random access memory and read only memory. In some embodiments, the processor 104 and memory 108 may be combined in a single chip. The network interface(s) 120, 122 allow the computer to communicate with other devices via a computer network, and may comprise a modulator/demodulator (MODEM). Memory 108 may store data the processed in the method as well as the instructions for performing the exemplary method.

The digital processor 104 can be variously embodied, such as by a single core processor, a dual core processor (or more generally by a multiple core processor), a digital processor and cooperating math coprocessor, a digital controller, or the like. The digital processor 104, in addition to controlling the operation of the computer 102, executes instructions 106 stored in memory 108 for performing the method outlined in FIG. 4.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The computer system 102 also includes one or more input/output (I/O) interface devices 120 and 122 for communicating with external devices. The I/O interface 120 may communicate with one or more of a display device 124, for displaying information, and a user input device 126, such as a keyboard or touch or writable screen, for inputting text, and/or a cursor control device, such as mouse, trackball, or the like, for communicating user input information and command selections to the processor 104. The various components of the computer system 102 may all be connected by a data/control bus 128. The processor 104 of the computer system 102 is in communication with an associated database 130 via a link 132. A suitable communications link 132 may include, for example, the public switched telephone network, a proprietary communications network, infrared, optical, or other suitable wired or wireless data transmission communications. The database 130 is capable of implementation on components of the computer system 102, e.g., stored in local memory 108, i.e., on hard drives, virtual drives, or the like, or on remote memory accessible to the computer system 102.

The associated database 130 corresponds to any organized collections of data (e.g., validation information, transportation system information (e.g., stops, nodes or stations, schedules, routes), crowdsourcing information (e.g., possible paths, durations, frequency of travel, expected transfer times), and the like) used for one or more purposes. Implementation of the associated database 130 is capable of occurring on any mass storage device(s), for example, magnetic storage drives, a hard disk drive, optical storage devices, flash memory devices, or a suitable combination thereof. The associated database 130 may be implemented as a component of the computer system 102, e.g., resident in memory 108, or the like.

In one embodiment, the associated database 130 may include data corresponding to an associated transportation system 134, a collection of routes 148 (a sequence of stops at transportation nodes to be made by an individual vehicle along of a course of travel available on the transportation system 134), schedules 150 for each of these routes 148, transportation nodes, such as stations or stops 143, paths (i.e., a sequence of successive origins and destinations between a first origin and the last destination, services 152, duration 154, walking distances 156, and validation sequence information 136. For example, in the case of a public transportation system, the associated database 130 may include information relating to the public transportation system 134 such as public transportation routes (e.g., a known sequence of scheduled stops by an individual bus, subway, train, etc.) 148, schedules 150 that pertain to the arrival/departure times of buses, trams, subways, etc., of the transportation system 134 for these routes 148, public transportation stops (or stations) 143, i.e., fixed locations, or nodes, that are linked by the transportation system 134, and a set of paths between two stops 143, each path being associable with one or more transportation routes 148 (e.g., a path may include beginning a journey by train at a first station (origin), riding the train (along the train's scheduled route) to a second station, transferring to a bus at the second station, and riding the bus (along the bus's scheduled route) so as to alight at a third station (destination)).

The database 130 may further include a set 138 of one or more trips 111, corresponding to actual trips taken by travelers of the transportation system 134. Each trip 111 in the set of trips 138 output by the trip extractor 110 from received validation information 137 may include, for example, timestamps 140, origins 142, destinations 144, and the like. It will be appreciated that other information associated with a particular trip 111 may be received in the validation information 137 and extracted by the trip extractor 110 for storage in the associated database 130. For example, a set of ticket validation sequences that may be derived from the validation information 137 collected from various collection components (e.g., the automatic ticketing validation system 160 located at stations or on vehicles of the transportation system 134. In such an example, the validation sequences may include, for example, timestamps representative of respective sequences of boarding and alighting timestamps, locations representative of origins and destinations corresponding to the timestamps, sequence tags, and a ticket identifier corresponding to each validation sequence.

For example, in the context of a public transportation system, the validation information 137 may pertain to travelers, such as each ticket's unique identification 145 (e.g., the ticket identification 145 may be derived from a smart card, a transit card, transit ticket, or the like, that cannot be rewritten or otherwise altered by the user (anti-counterfeiting properties)), locations 141 (origin and destination locations), sequence tags (first use, correspondence use, etc.), timestamps 140 associated with the transfer times between an origin and a destination for that particular validation sequence. That is, each validation sequence may include the time of entry of the traveler on the public transportation network 134 along with the corresponding location 141 or route 148 (i.e., stop 143 on the route 148) at which the traveler boarded or alighted, and the like. While each traveler on a public transport system is generally a person, travelers of other networked transportation systems may include goods or other inanimate objects.

Each location 141 of the validation information 137 may include one or more of a route identifier e.g., a route number, a transportation node identifier, e.g., a stop number, an address, GPS coordinates, or other geographical identification information associated with the location. The time component of the stamp 140 may include one or more of a time of day, a day, a date, or other temporal information corresponding to the timestamp 140. The validation information 137 collected and used in the various embodiments contemplated herein may thus be ticketing data, collected via usage of prepaid cards, single use transit tickets, reloadable transit cards, or other ticketing devices. The above references sequence tags may reflect where or when in the a particular validation sequence the boarding or alighting of the traveler occurred, i.e., a "First" tag may indicate the first use of the ticket identification 145, whereas a "Correspondence" tag may indicate the second and each subsequent use of the ticket identification 145 within a specified time period.

The validation information 137 may be collected from a plurality of locations on the associated transportation system 134. As briefly discussed above, each of these locations may correspond to one of a finite set of locations (e.g., stations, stops, etc.) connected by the transportation system 134, or vehicles which travel along routes 148 of the transportation system 134. It will be appreciated that the collection of such information 137 may be performed by ticket validation machines for fare collection, i.e., automatic ticket validation systems 136 at each respective location, such as smart card readers, magnetic card readers, input terminals, ticket dispensers, ticket readers, and the like. It will be appreciated that such automatic ticket validation systems may be implemented at stations, on vehicles, etc., and may represent automatic fare collection subsystems.

Various travelers on the transportation system 134 may use transportation cards/tickets. Such cards/tickets may be used to pay for or otherwise enable travel on the transportation system 134 and thus are scanned, read, inserted in, or otherwise detected by the automatic ticket validation systems 136 as the travelers travel through the transportation system 134 from an origin location 142 to a destination location 144. Such transportation cards may include smart card-like capabilities, e.g., microchip transmissions, magnetically stored data, and the like. In such embodiments, the automatic ticket validation systems 136 communicate validation information 136 to the computer system 102 via link 146. A suitable communications link 146 may include, for example, the public switched telephone network, a proprietary communications network, infrared, optical, or any other suitable wired or wireless data transmission communications.

It will be appreciated that additional information may be collected by the automatic ticket validation systems 136 corresponding to ticketing operations including transportation usage data, ticketing receipt data, congestion data, and the like. According to one embodiment, both entries and exits of passengers on and off vehicles or nodes of the transportation system 134 may be collected as validation information 137. Entry-only systems, in contrast, may allow for the collection of electronic validation records pertaining only to the entry of a traveler on a vehicle or at an origin node of the transportation system 134. While the destinations of travelers in an entry-exit system may be discernible from the automatic ticketing validation data, i.e., the validation information 137 collected by the automatic ticket validation systems 136, destinations of passengers in an entry-only automatic ticketing validation system 136 may be discerned through inferences based upon non-validation data (e.g., transportation system routes and schedules, event occurrences (sports, concerts, etc.), or the like) and traveler assumptions.

The systems and methods described herein may use one-trip tickets as well as prepaid cards, which are reflected in the ticket identification 145 included in the collected validation information 137. A one trip ticket may have a fixed validation time, i.e., a period of time during which the ticket remains valid for use by a traveler. For example, in entry-only systems, the time during which the ticket is valid may be limited to 1 hour from the time of issuance/purchase, during which time travelers may change vehicles within the transportation network 134 without incurring an additional charge. The first validation of such a ticket may be identified by a sequence tag indicating 'First', whereas the second and subsequent validations during this validation time may be identified by a sequence tag indicating 'Correspondence'. The automatic ticketing validation systems 136 may allow for the use of multiple entry cards, which may provide for multiple entries by a traveler and long-term permanent cards to requesting travelers. It will be appreciated that the use of multiple entry cards may permit tracking traveling data of each card holding traveler, as well as allowing for time-based analysis of such travelers.

The automatic ticketing validation systems 136 may allow for location identification, corresponding to the entry or the entry and exit of a traveler. For example, the automatic ticketing validation systems 136 may enable each validation of a ticket to include a ticket ID 145, a timestamp 140 and a correspondence tag. Additionally, the automatic ticketing validation systems 136 can use automatic vehicle location subsystems to associate a ticket validation with the public transportation route 148, stop identifier (e.g., stop 143) and direction. Other methods for collecting validation information 137 may alternatively or additionally be used, including, mobile communication events, e.g., time-stamped antenna authentication sequences or other observations of the intersecting of scheduled activities and traveler schedules. The ticket validations, i.e., the validation information 137 collected in the automatic ticketing validation systems 136 may provide information for understanding the traveler flows in the transportation network 134. Information in a typical installation can be analyzed in order to provide valuable insights for the transit and public transportation agencies and assist in decision making processes.

The validation information 137 associated with the implementation of FIGS. 1A-1B is for example purposes only. Other applications outside of the public transportation example are also contemplated. For example, toll-road monitoring and management systems may also take advantage of the subject systems and methods, whereby validation information 137 is collected at toll-booths, upon entry and exit of a vehicle with respect to the associated toll road. Other embodiments, e.g., hospital monitoring of patient/employee entries and exits, secure facility monitoring, and the like, are also contemplated.

As depicted in FIGS. 1A-1B, the trip re-ranking system 100 may include or communicate with one or more user access devices 176, depicted in FIGS. 1A-1B as a portable communication device, e.g., a mobile smartphone, which is capable of interacting with the computer system 102 via a suitable link 184. Device 176 is representative of any personal computing device, such as a personal computer, a netbook computer, a laptop computer, a workstation computer, a personal data assistant, a web-enabled cellular telephone, a tablet computer, a proprietary network device, or other web-enabled electronic device. The data communications link 184 between the computer system 102 and the user access device 176 may be accomplished via any suitable channel of data communications such as wireless communications, for example Bluetooth, WiMax, 802.11a, 802.11b, 802.11g, 802.11(x), a proprietary communications network, infrared, optical, the public switched telephone network, or any suitable wireless data transmission system, or wired communications.

The user device 176 may include a processor 182, system memory 178, system storage, buses that couple various system components including the system memory 178 to the processing unit 182, and the like. The user device 176 may be suitably configured to interact with the computer system 102, to access the database 130, submit trip requests 162, receive a re-ranked k-top list of trip plans 165, and the like. Specifically, the user device 176 may include a web-browser, dedicated application, or other thin client interface 180, e.g., stored in memory 178, which is operable to interact with the computer system 102. The thin client 180 may be suitably configured to display a graphical representation of the associated transportation system 134, routes 148, schedules 150, services 152, and the like. Processor 182 and memory 178 can be configured as set forth above with respect to the processor 104 and memory 108 of the computer system 102.

In accordance with one embodiment, a user of the system 100, e.g., a person wishing to determine a suitable trip between a desired origin 168 and a desired destination 170 at a selected departure time 172, may submit a trip request 162 for processing by the computer system 102. The trip request 162 may be submitted via the link 184 or directly input to system 102. The trip request 162 serves as a request for a list of top-rated trips 165 between a selected origin 168 (corresponding to a stop/station 143 on the system 134) and a selected destination 170 (corresponding to another stop/station 143), which may include any number of intervening stations 143 stored in the database 130. In such an embodiment, the trip request 162 may include an origin (O) 168, a destination (D) 170, desired departure time 170, and optionally, a selected service preference 174 (e.g., bus only, tram only, subway only, etc.). The trip request 162 may be input by the user via access to the thin client 180 operable on the user device 176 in data communication with the computer system 102, via user interactions with the user input device 126 with results displayed on the display device 124, or the like.

The trip request 162 may then be sent to the journey planner 158 for a determination as to the k-top list of trips 164 by the associated journey planning engine 160. This k-top list of trips 164 may then be processed by re-ranking component 118 of the computer system 102 to re-rank the trips 111 into the re-ranked k-top list of trips 165. Thereafter, the re-ranked k-top list of trips 165 may be communicated, via the communications link 184, from the computer system 102 to the user device 176, to the display 124, or the like.

Figure 2A:
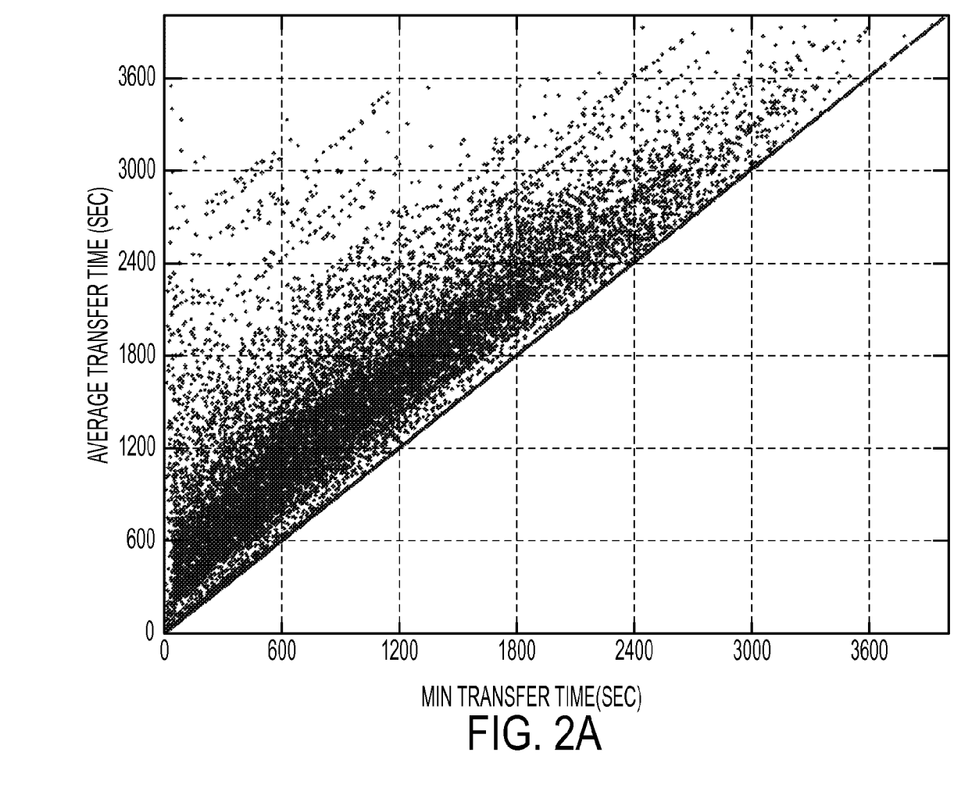
FIG. 2A illustrates a distribution of a minimal versus average travel time for an example transportation network according to one embodiment of the subject application.
Figure 2B:
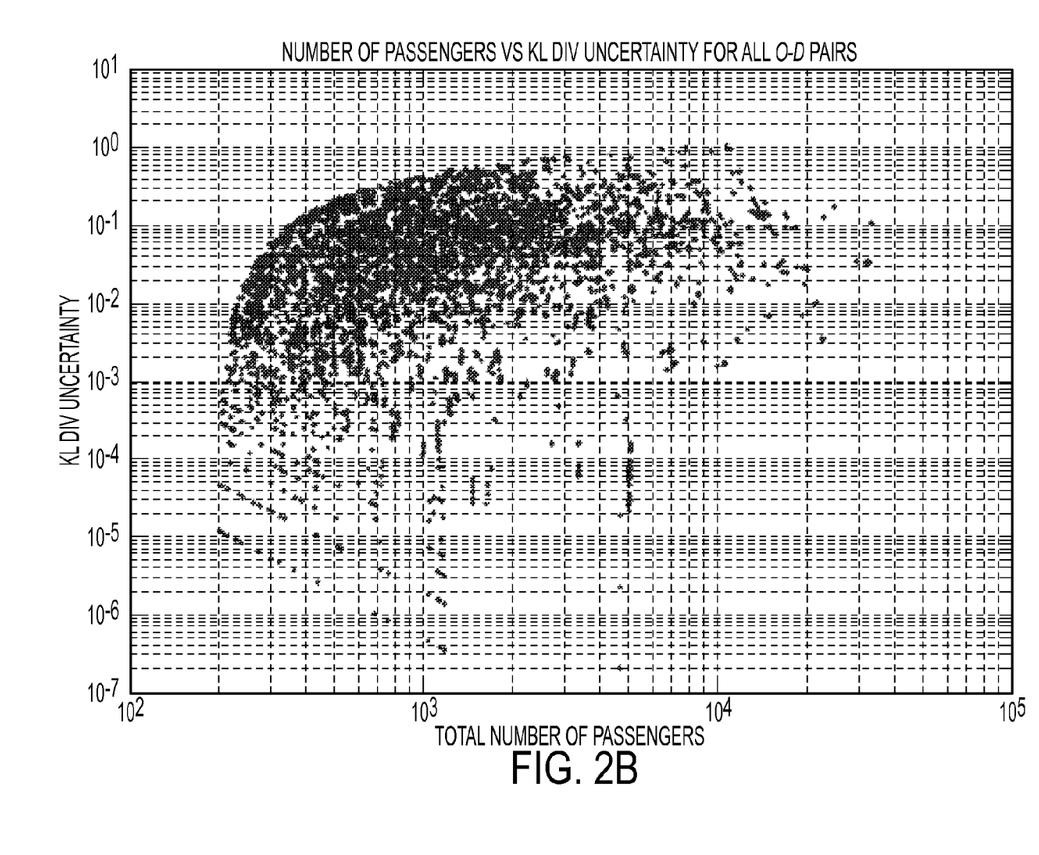
FIG. 2B illustrates the Kullback-Leibler divergence values for all origin-destination pairs in the transportation network depicted in FIG. 2A.

FIGS. 2A-2B illustrate a divergence between an output of the journey planner 158 and the trips 111 in the set of trips 138 of the actual users of a public transportation network 134. The example depicted in FIGS. 2A-2B corresponds to validation information collected in Nancy, France over a three-month period. For every pair of locations (o,d) in the public transportation network 134, all different journeys from o to d are extracted and their travel time distribution is analyzed. FIG. 2A shows the distribution of the minimal versus the average travel time for the entire network 134, where any point refers to one (o,d) pair. It will be appreciated that the zone of the high density suggests that the average travel time is far longer than the minimal time which is conventionally assumed by the trip planner 158.

Continuing with the preceding example, in the Nancy dataset, 57% of stop pairs (accounting for 69% of the total traffic) have at least two different trips from the origin to destination; the maximum number of different trips observed is 46; the average number of trips between two locations equals to 2.71. To measure the uncertainty of choosing one or another trip from an origin to a destination, the Kullback-Leibler divergence $KL(q\|p)$ of the trip distribution q from the uniform trip distribution p may be utilized in accordacne with one embodiment of the subject application. The higher KL values indicate the higher certainty and a demonstrable domination of one trip over others. FIG. 2B plots the KL divergence values for all (o,d) location pairs in the network 134 using the log-log scale. As will be appreciated from the example illustrated in FIGS. 2A-2B, the analysis of the high density zone suggests that a large part of location pairs is dominated not by one but by 2 to 5 different trips of high frequency. Furthermore, the preference of different trips clearly changes during the day.

Figure 3A:
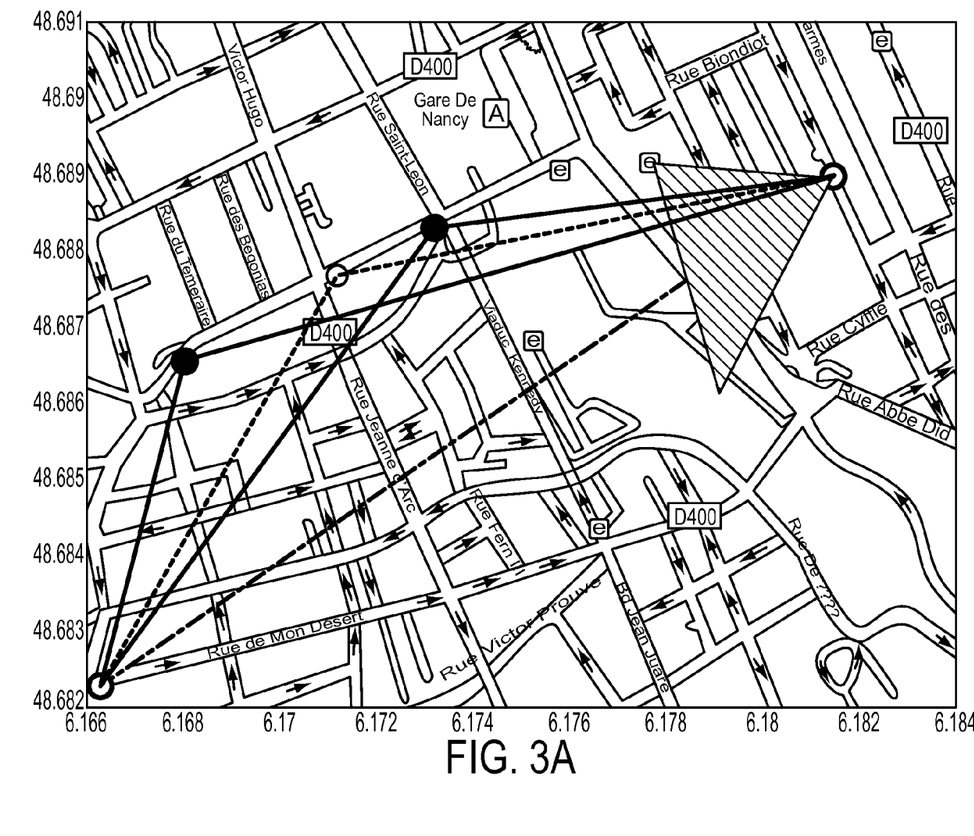
FIG. 3A is graphical representation of a top three transit trips for an example origin-destination pair in accordance with one aspect of the exemplary embodiment.
Figure 3B:
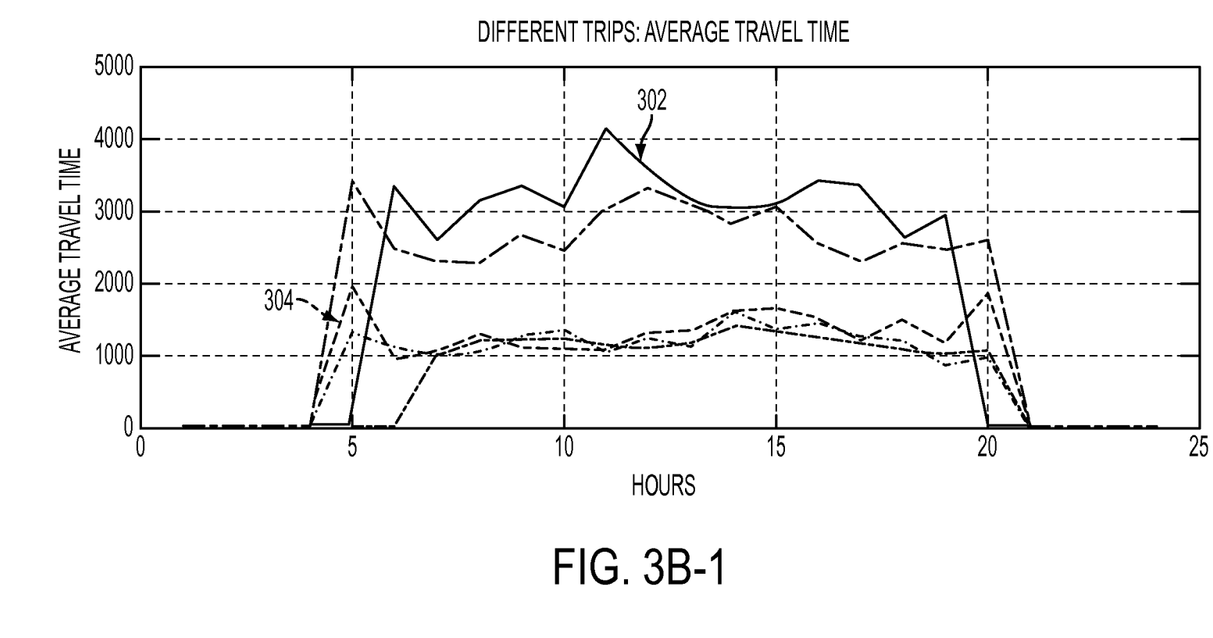
Figure 3B:
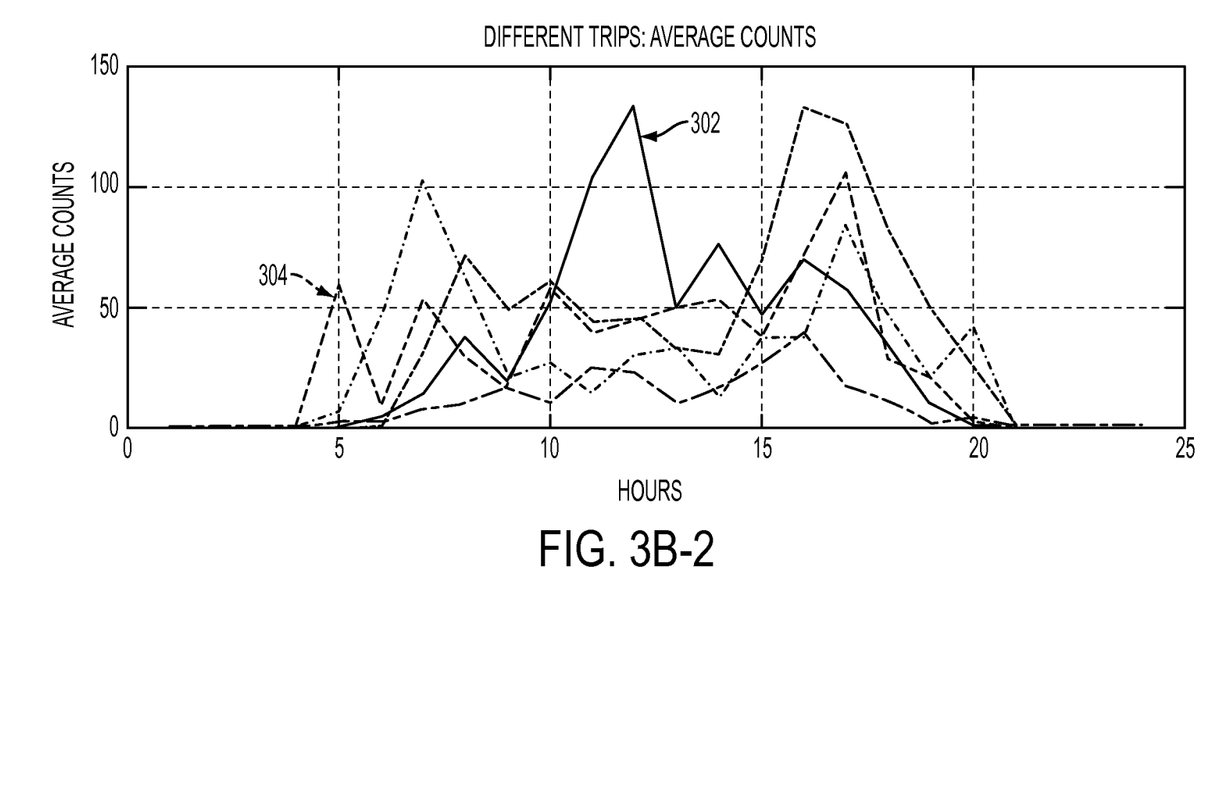

The above-observations are illustrated more fully in FIGS. 3A, 3B-1, and 3B-2. FIG. 3A depicts the three top transit trips for an example (o,d) location pair in Nancy. FIGS. 3B-1 and 3B-2 show the travel time and average trip counts for 5-top trips for this example. As shown, each of the 5 trips is a transit trip with one change, i.e., transfer. It will be appreciated that FIGS. 3A, 3B-1, and 3B-2 illustrate that travelers' preferences vary during the day. The journey planner 158 recommends the trip 304 for the fastest trip query. As shown, the recommended trip 302 is not the fastest nor the most frequently chosen one, and further, the trip 302 is the most frequent during the times commonly associated with lunch, despite the trip 302 being one of the slowest trips.

Figure 4:
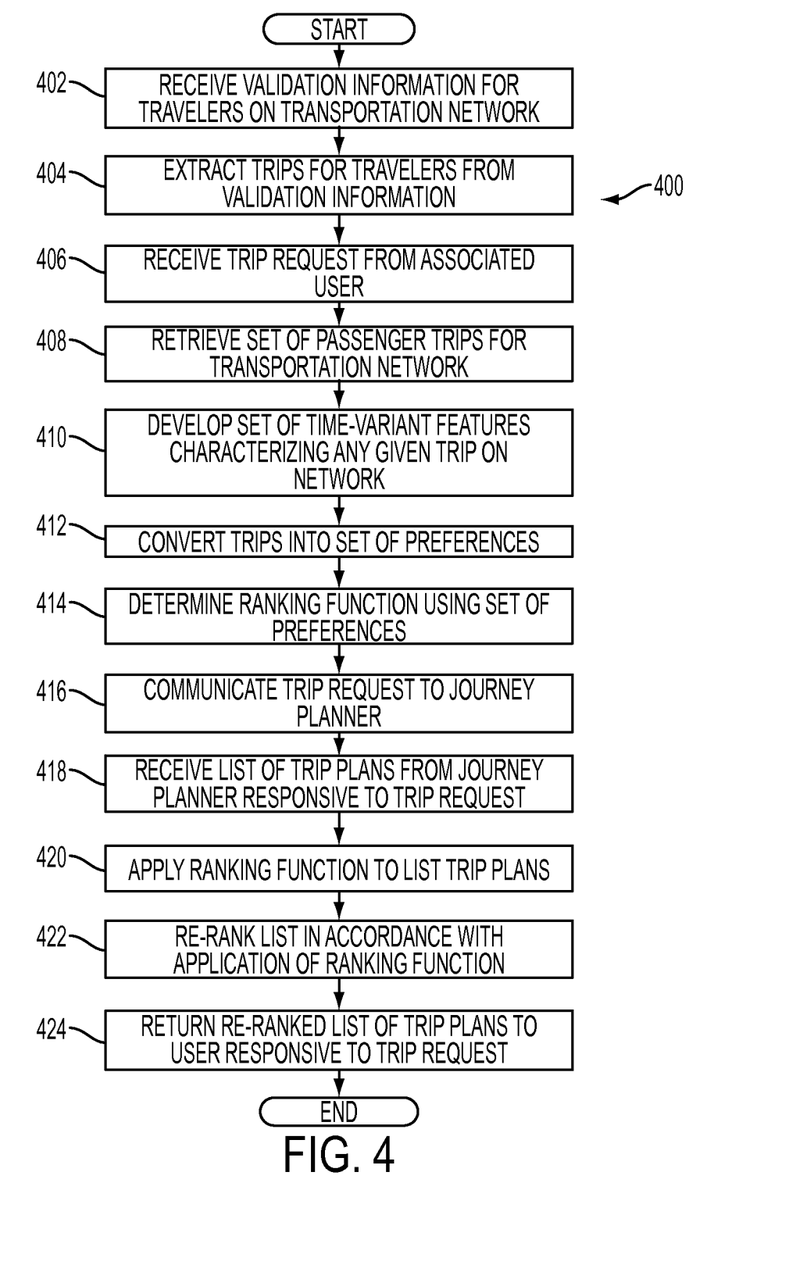
FIG. 4 is a flowchart which illustrates part of the method for re-ranking a trip on an associated transportation network in accordance with one aspect of the exemplary embodiment.

Turning now to FIG. 4, there is shown a flowchart 400 illustrating a method for re-ranking trips on an associated transportation network according to one embodiment. The methodology of FIG. 4 begins at 402, whereupon validation information 137 is received from at least one automatic ticketing validation systems 136, said validation information may include timestamps 140, locations 141 (e.g., stops 143) and ticket identifications 145. At 404, each trip 111 undertaken by a traveler, as indicated by the validation information 137, is extracted. Each trip 111 includes at least a timestamp 140, an origin 142, and a destination 144. The trip 111 may be extracted or otherwise determined by the trip extractor 110 from validation information 137 collected by one or more automatic ticketing validation systems 136.

At 408, a set of trips 138 for the associated transportation network 134 is retrieved from the associated database 130 corresponding to the received trip request 162 from the associated user. As discussed above, each trip 111 in the set 138 thereof corresponds to an actual journey taken by a traveler on the transportation network 134. According to one embodiment, each trip 111 forming the set of trips 138 includes a common origin 168, destination 170, and departure time 172, which also corresponds to the origin 168, destination 170 and departure time 172 of the received trip request 162. In one embodiment, the trip request 162 may specify a desired service 174, and the retrieved set of trips 138 may also be further limited to those trips 111 using the selected service 174.

At 410, a set of time-variant features 194 characterizing any given trip 111 in the set of trips 138 on the transportation network 134 are developed by the characterizing component 114 or other suitable component associated with the computer system 102. At 412, the preference converter 112 or other suitable component associated with the computer system 102 converts the set of trips 138 into a set of preferences 192, in accordance with the determined set of time-variant features 194. As discussed above, the preferences 192 may include, for example, traffic preferences (e.g., traveler avoids buses), temporal and/or spatial (time, route, etc.) inferred from data set 138. That is, it will be appreciated that the preferences 192 correspond to the reason (implicit/explicit) that a traveler preferred a particular route (trip 111) at a particular time.

In accordance with one embodiment, the user preferences 192 are modeled by the preference converter 112 as a distribution in a spacial-temporal space. To learn user preferences 192, e.g., during learning operations as discussed above for determining the ranking function 190 and below at 414, each trip 111 is characterized by a set of time-dependent features. When a traveler selects a specific trip it implicitly prefers this trip to other trips. There are an infinite number of explicit and implicit factors which may influence the passenger choice. Due to their eventual infinity and partial observation, they may not be explicitly identified. Accordingly, in the example embodiments disclosed herein, trips 111 are characterized through a set of features 194 which can capture different aspects of this choice. The trips 111 are processed to instantiate the set of pair-wise preferences 192. During the training, the method will find the optimal weights for different aspects/features, which explains the best the trip choices made by the passengers.

In accordance with one embodiment, various groups of time-variant features 194 may be used, global features, local features, dynamic features, etc. Global features are characteristics describing the whole trip 111, such as the expected travel time, the number of changes, the usage of specific types of transport (bus, train, tram, etc.), multi-modality, etc. Local features describe each of the elements which compose the trip 111. For each bus/tram line/service used during the trip 111, the estimated means and variance of the speed when using this line at this time period, and the average delay with respect to the schedule is extracted. For each transfer point, an additional characteristic estimated may include the walking distance if any, the closeness to a commercial zone or transportation hub, etc. Dynamic features are optional, they concern the environmental conditions of the trip, such as traffic condition, bus occupancy, schedule delay, etc. Using these features for learning the preference model is possible only under the condition of accessing the real time information to make accurate predictions. According to one example implementation, a total of 6 global and 244 local features have been identified for characterizing the totality of trips 138.

At 414, as indicated above, a ranking function 190 is determined using the set of preferences 192 as characterized by the set of time variant features 194 via the ranking function calculator 116 or other suitable component associated with the system 100. When a traveler takes trip t to travel from origin o to destination d at starting time s, the traveler implicitly prefers this trip to other trips. To learn the ranking function, this implicit preference is transformed into a explicit set of pair-wise preferences.

Algorithm 1, set forth below, instantiates these preferences by using the trip planner and a observed set T of real trips. For any real trip t matching the query q=(o,d,s), the algorithm uses the journey planner 158 to retrieve the k-top trip candidates 164 for q and determines whether the trip t has been preferred to any of these candidates, except the trip t itself if it happens to be in this set.

Algorithm 1. Rank learning algorithm.

Require: Collection T of passenger trips in the form (q, t) where q = (o, d, s)
Require: Journey planer P with k-top recommendations
1: S = Ø
2: for each (q, t) ∈ T do
3:   Query the trip planner T with query q
4:   Retrieve k-top trips as a list L
5:   for each t' ∈ L, t' ≠ t
6:     Add (q, x(t) > x(t')) to S
7:   end for
8: end for
9: Split S in time ranges S(r), r = 1..v
10: Learn ranking SVM models M(r) with S(r)
11: return M(r), r = 1..v Algorithm 1 requires a definition of a match between a real trip t and a recommended trip t'. In the embodiments discussed herein, the strict definition of the trip match is considered, according to which trips t and t' follow the same sequence of the services (for example, ones identified according to the service schedule) and the corresponding changes between them. The ranking function 190 is then stored in the associated database 130 for subsequent use in responding to queries from users for trip plans.

Returning to FIG. 4, at 416, the trip request 162 received from an associated user including an selected origin 168, a selected destination 170, a departure time 172, and, optionally, a preferred service 174 (e.g., bus, train/tram, direct, etc.) is communicated to the journey planner 158 for processing by the planning engine 160.

At 418, the re-ranking component 118 receives a k-top list of trips 164 from the journey planner 158 responsive to the trip request 162. The re-ranking component 118 then retrieves the ranking function 190 corresponding to the received query, i.e., trip request 162, and applies, at 420, the ranking function to the retrieved k-top list of trips 164 to re-rank, at 422, the list in accordance with the applied ranking function 190. The re-ranked k-top list 165 is then returned, at 424, to the user responsive to the received trip request 162.

Algorithm 2, depicted below, illustrates the operations of the system 100 responsive to receiving a trip request 162 from a user.

---
Algorithm 2. Trip re-ranking algorithm.
---
Require: Journey planner P with k-top recommendations.
Require: Re-ranking functions M(r) for passenger trips, r = 1..v.
1: Let user formulate a query q = (o, d, s) eventually extended with one or more additional constraints.
2: Query planner P with q, detects k-top candidate trips as list L.
3: Re-rank the candidates in L using the ranking function M(r), s ∈ r.
4: return The re-ranked list of trips to the user.
---

The method illustrated in FIG. 4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 4 can be used to implement the method for crowdsourcing a transportation network.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for re-ranking trips on an associated transportation network, comprising:

receiving, from a plurality of automatic ticketing validation systems, validation information for each of a plurality of travelers of the associated transportation network, the validation information including a timestamp, at least one location, and a ticket identification;

extracting, from the validation information, a trip for each of the plurality of travelers of the transportation network, the trip comprising an origin, a destination, and at least one of a departure time or a service;

storing the extracted trips in an associated database;

receiving, at a computer system from a user device over a computer network, a trip request from an associated user, the trip request including an origin, a destination and a departure time on the associated transportation network;

retrieving, from the associated database, a set of actual trips corresponding to the received trip request, the set of actual trips each having a common origin, destination and departure time corresponding to the received trip request;

determining a ranking function associated with the trip request in accordance with the retrieved set of actual trips corresponding to the received trip request;

receiving, from an associated journey planner, a list of candidate trips on the associated transportation network corresponding to the received trip request;

applying the ranking function to the list of candidate trips so as to re-rank the candidate trips in the list thereof;

returning, to the user device over the computer network, a re-ranked list of candidate trips in response to the trip request; and displaying, on a display of the user device, the re-ranked list of candidate trips, wherein at least one of the receiving, retrieving, determining, applying, returning is performed by a computer processor of the computer system.

2. The method of claim 1, wherein the retrieving the set of actual trips further comprises developing, for each trip in the set thereof, a set of time-variant features characterizing the trip on the associated transportation network.

3. The method of claim 2, further comprising converting the set of actual trips into a set of real-world traveler preferences in accordance with the set of time-variant features, the set of real-world traveler preferences corresponding to implicit preferences of travelers of the associated transportation network.

4. The method of claim 3, wherein the time-variant features comprise at least one of a global feature, a local feature, or a dynamic feature.

5. The method of claim 3, wherein determining the ranking function further comprises, for each trip in the set of actual trips matching the received trip request:

receiving, from the journey planner, a set of trip candidates corresponding to the trip request;

analyzing the set of top trip candidates to determine whether the trip of the set of actual trips has been preferred to any of candidate trips;

adding the trip of the set of actual trips to a set of training trips associated with the trip request responsive to a preference of the trip over the candidate trips; and learning a ranking function corresponding to the trip request in accordance with the set of training trips.

6. The method of claim 5, wherein the ranking function is a ranking support vector machine ranking function.

7. The method of claim 1, wherein the associated transportation network is a public transportation network.

8. The method of claim 1, wherein the set of actual trips corresponding to the received trip request is generated from the extracted trips in the associated database.

9. A system comprising memory storing instructions for performing the method of claim 1, and a processor in communication with the memory which implements the instructions.

10. A system for re-ranking trips on an associated transportation network, comprising:
a journey planner including a journey planning engine configured to receive a trip request and return a list of candidate trips on the associated transportation network responsive thereto;
a re-ranking component configured to apply a ranking function to the list of trips and generate a re-ranked list of candidate trips;
a processor of a computer system in communication with a user device over a computer network; and
memory, in communication with the processor, which stores instructions which are executed by the processor for:
receiving, from a plurality of automatic ticketing validation systems, validation information for each of a plurality of travelers of the associated transportation network, the validation information including a timestamp, at least one location, and a ticket identification,
extracting, from the validation information, a trip for each of the plurality of travelers of the transportation network, the trip comprising an origin, a destination, and at least one of a departure time or a service,
storing the extracted trips in an associated database,
retrieving, from the associated database, a set of actual trips corresponding to the received trip request, the set of actual trips each having a common origin, destination and departure time corresponding to the received trip request,
for each trip in the set of actual trips:
receiving, from the journey planner, a set of trip candidates corresponding to the trip request,
analyzing the set of top trip candidates to determine whether the trip of the set of actual trips has been preferred to any of candidate trips,
adding the trip of the set of actual trips to a set of training trips associated with the trip request responsive to a preference of the trip over the candidate trips,
learning a ranking function corresponding to the trip request in accordance with the set of training trips,
returning, to the user device over the computer network, the re-ranked list of candidate trips in accordance with the learned ranking function, and
displaying, on the user device the re-ranked list of candidate trips in accordance with the learned ranking function.

11. The system of claim 10, further comprising instructions for developing, for each trip in the set of actual trips, a set of time-variant features characterizing the trip on the associated transportation network.

12. The system of claim 11, further comprising instructions for converting the set of actual trips into a set of real-world traveler preferences in accordance with the set of time-variant features, the set of real-world traveler preferences corresponding to implicit preferences of travelers of the associated transportation network.

13. The system of claim 12, wherein the time-variant features comprise at least one of a global feature, a local feature, or a dynamic feature.

14. The system of claim 10, wherein the ranking function is a support vector machine function.

15. The system of claim 12, wherein the set of actual trips corresponding to the received trip request is generated from the extracted trips in the associated database.

16. A computer-implemented method for re-ranking trips on an associated public transportation network, comprising:
receiving, from a plurality of automatic ticketing validation systems, validation information for each of a plurality of travelers of the transportation network, the validation information including a timestamp, at least one location, and a ticket identification;
extracting, from the validation information, a trip for each of the plurality of travelers of the transportation network, the trip comprising an origin, a destination, and at least one of a departure time or a service;
storing the extracted trips in an associated database;
receiving a trip request from an associated user device over a computer network, the trip request including an origin, a destination and a departure time on the associated transportation network;
retrieving, from the associated database, a set of actual trips corresponding to the received trip request, the set of actual trips each having a common origin, destination and departure time corresponding to the received trip request, wherein the set of actual trips corresponding to the received trip request is generated from the extracted trips in the associated database;
for each trip in the set of actual trips matching the received trip request:
receiving, from the journey planner, a set of trip candidates corresponding to the trip request, analyzing the set of top trip candidates to determine whether the trip of the set of actual trips has been preferred to any of candidate trips,
adding the trip of the set of actual trips to a set of training trips associated with the trip request responsive to a preference of the trip over the candidate trips,
developing, for each trip in the set thereof, a set of time-variant features characterizing the trip on the associated transportation network,
converting the set of actual trips into a set of real-world traveler preferences in accordance with the set of time-variant features, the set of real-world traveler preferences corresponding to implicit preferences of travelers of the associated transportation network, and
learning a ranking function corresponding to the trip request in accordance with the set of training trips and real-world traveler preferences;
receiving, from an associated journey planner, a list of candidate trips on the associated transportation network corresponding to the received trip request;
applying the ranking function to the list of candidate trips so as to re-rank the candidate trips in the list thereof;
returning, in response to the trip request, a re-ranked list of candidate trips to the user device over the computer network; and
displaying, on the user device the re-ranked list of candidate trips.

* * * * *